United States Patent [19]

Asada et al.

[11] 3,965,466

[45] June 22, 1976

[54] DIGITAL DISPLAY

[75] Inventors: Atsushi Asada; Hideo Yoshida, both of Nara; Akihiko Kunigane, Yamatokoriyama, all of Japan

[73] Assignee: Sharp Kabushiki Kaisha, Osaka, Japan

[22] Filed: Apr. 23, 1974

[21] Appl. No.: 463,266

[30] Foreign Application Priority Data

| Apr. 23, 1973 | Japan | 48-45926 |
| May 18, 1973 | Japan | 48-56637 |

[52] U.S. Cl. ........................ 340/336; 235/92 EA; 340/324 R
[51] Int. Cl.² ........................................ G08B 5/36
[58] Field of Search ............. 340/336; 235/92 EA, 235/156

[56] References Cited
UNITED STATES PATENTS

| 3,492,656 | 1/1970 | Hildebrandt | 340/324 R |
| 3,721,084 | 3/1973 | Dargent | 58/50 R |
| 3,760,171 | 9/1973 | Wang et al. | 235/156 |
| 3,786,480 | 1/1974 | Hatano et al. | 235/92 EA |
| 3,803,827 | 4/1974 | Roberts | 58/4 A |
| 3,820,107 | 6/1974 | Niizawa et al. | 340/336 |

Primary Examiner—David L. Trafton
Attorney, Agent, or Firm—Stewart and Kolasch, Ltd.

[57] ABSTRACT

The digit-capacity of display units is made smaller than that of a register storing the numeral information for indication to reduce the size and assembly cost of the apparatus equipped with the display units. To display the whole of the numeral information stored in the register, the numeral information is divided with reference to the decimal point thereof into a plurality of groups, each group being a digit number equal to the digit-capacity of the display units, and then the numeral information is displayed progressively group-to-group on the display units.

10 Claims, 4 Drawing Figures

DIGITAL DISPLAY

BACKGROUND OF THE INVENTION

The present invention relates to a display system for displaying numeral information stored in a register.

In conventional electronic calculator designs, the digit-capacity of display units is equal to that of a register storing the numeral information introduced or operated. Each numeral information in the register is displayed on a display unit at the corresponding digit position.

In another conventional design, the digit-capacity of display units is a half of that of the register. In the case where the numeral information introduced or operated has digits exceeding the digit-capacity of the display units, the over-flow numeral information is displayed on the display units by closing a selection switch.

The former design is popular and has advantages of being able to see the whole of introduced information or operated outputs at the same time, but needs a number of display units. In recent years, integration of operation circuits enables reduction of the cost thereof and of time for accommodating the operation circuits into a system. Under these conditions, the display units, not suitable to circuit integration technique, are heavy in bulky devices.

For the above-described reasons, the latter design is sometimes used wherein the digit-capacity of the display units is smaller than that of the register and the upper portion and the lower portion of the numeral information are displayed separately. However, in the conventional design, the numeral information is divided into two groups with reference to the last digit of the information stored in the register. It means that the weight of the numeral information in every digit is not taken into consideration in displaying the numeral information.

OBJECTS AND SUMMARY OF THE INVENTION

Accordingly an object of the present invention is to provide a digital display system wherein the weight of the numeral information in every digit is taken into consideration in displaying the numeral information on display units having a digit-capacity smaller than that of a register storing the numeral information to be displayed.

To this end, the numeral information in the register is divided with reference to the decimal point thereof into a plurality of groups, each group being in digit number equal to the digit-capacity of the display units. The numeral information is displayed progressively group-to-group on the display units.

The state of displaying is changed in accordance with the contents of the register. That is, it is changed by detecting whether the introduced numeral information is an integral part or the decimal point. And the state of displaying is also changed by detecting whether the operated outputs have valid numerals in the decimal part thereof.

DESCRIPTION OF THE PREFERRED EMBODIMENTS

Figures 1, 3:
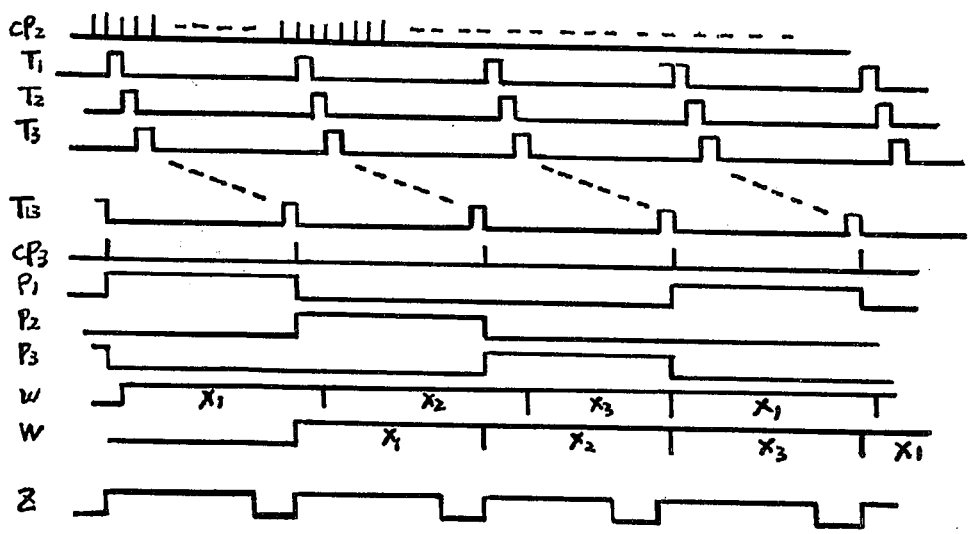
FIG. 1 is a chart showing relation between the contents of a register and that of displaying for explaining the present invention.
FIG. 3 is a time chart showing various signals which occur in the circuits of FIG. 2.

Before describing an embodiment of the present invention which comprises essentially a register for storing the numeral information of 12-digits and display units of 3-digits, the mode of display in accordance with the teachings of the present invention will be described with reference to FIG. 1, wherein $X_{12} - X_1$ shows the state of every digit of the register and $DP_3 - DP_1$ show the state of displaying on the display units of 3-digits. The chart of FIG. 1 shows the state of the register and the display units which changes in accordance with any depressed key and operated outputs.

As an example, "1234.56" is provided as the introduced numeral information.

In a preferred embodiment, a fixed decimal point system is employed, and the numeral information introduced or operated has the decimal point at the fourth digit, that is, the digit of $10°$ is at the position $X_4$. When the numeral key "1" is depressed, the numeral information 1 is introduced into the $X_4$. The following numeral information of every digit in the integer part is introduced into the $X_4$ when the numeral key is depressed and the preceding numeral information is shifted to the adjacent upper digit of the register progressively. Under these conditions, the display unit $DP_3$ displays the contents of $X_6$, the display unit $DP_2$ displays the contents of $X_5$ and $DP_1$ displays $X_4$, respectively, since the numeral information of the integer part is introduced. In this embodiment the numerals 0 in the upper part of the integral part are not displayed since they are invalid.

$DP_3$ displays 1, $DP_2$ displays 3 and $DP_3$ displays 3 respectively, where the numeral information 123 is introduced. When the numeral key 4 is depressed, the numeral information 4 is introduced into the $X_4$ and $DP_3$ displays 2, $DP_2$ displays 3 and $DP_1$ displays 4 respectively, the instant numeral information introduced is to be confirmed.

In these ways, the numeral information in the integral part is introduced. Thereafter, when the decimal point key is depressed for introducing the numeral information in the decimal part, the state of display is changed, where the display unit $DP_3$ displays the content of the $X_3$, $DP_2$ displays $X_2$, $DP_1$ displays $X_1$.

The introduction of the numeral information in the decimal part is achieved in a manner that the numeral information 5 of the first digit in the decimal part is introduced into the $X_3$ and 6 of the second digit is introduced into $X_2$. The display unit $DP_3$ displays 5 and $DP_2$ displays 6, respectively. The above-described introduction system is already employed in a calculator on sale, and a controlling system for the introduction system is described in Japanese Publication No. 32533/1971, for example.

After all of the numeral information is introduced, when the numeral information (except the numeral information displayed at the time on the display units) is desired to be displayed, a shift key $K_K$ is depressed. First of all, a block having the upper most digit of valid numeral information is displayed by depressing the shift key $K_K$. In the preferred embodiment the introduced numeral information is divided with reference to the decimal point thereof into a plurality of blocks, 000, 001, 234. and .560. The uppermost block is 001. That is, the display unit $DP_3$ displays the content of $X_9$, the $OP_2$ displays $X_8$ and the $DP_1$ displays $X_7$, respectively. Actually, only the numeral 1 in the display unit $DP_1$ is displayed, since the upper 00 is invalid.

Afterward, when the shift key $K_K$ is depressed again, the adjacent lower block is displayed. That is, $DP_3$ displays $X_6$, $DP_2$ displays $X_5$ and $DP_1$ displays $X_4$, respectively. When the shift key $K_K$ is depressed once more, the adjacent lower block, .560 is displayed.

The foregoing display is repeated progressively by every depression of the selection switch K.

In the case where the numeral informaion does not have valid numeral information in the decimal part thereof, for example, 1234.000, the display is repeated between $X_4$ and $X_9$ and the decimal part, or $X_1$ - $X_3$, is not displayed. in other words, the display is repeated in the block having the valid numeral information, progressively and selectively.

The following is the description of the mode of displaying the numeral information to completion. The block having the uppermost digit of valid numeral information takes precedence. In the present embodiment the block having the numeral 1 takes precedence, and the display unit $DP_3$ displays the content of $X_9$, $DP_2$ display $X_8$ and $DP_1$ displays $X_7$, respectively.

The following blocks in the register are displayed progressively and selectively by depressing the shift key $K_K$ in the same manner of that in the introduction operation.

FIG. 1 also shows the case where the decimal part has valid numerals. In addition, FIG. 1 shows the case where the decimal part comprises only 0, wherein the decimal part is not displayed, that is, the blocks 12 and 345. are displayed progressively.

By controlling the display system in the above-described fashion, the introduced numeral is displayed when the numeral information is introduced, and the uppermost block having the valid numeral information operated out is automatically displayed when the operation is completed. The contents of the register is efficiently confirmed on the display units, since the numeral information in the decimal part is detected to detemine whether it is valid.

Figure 2:
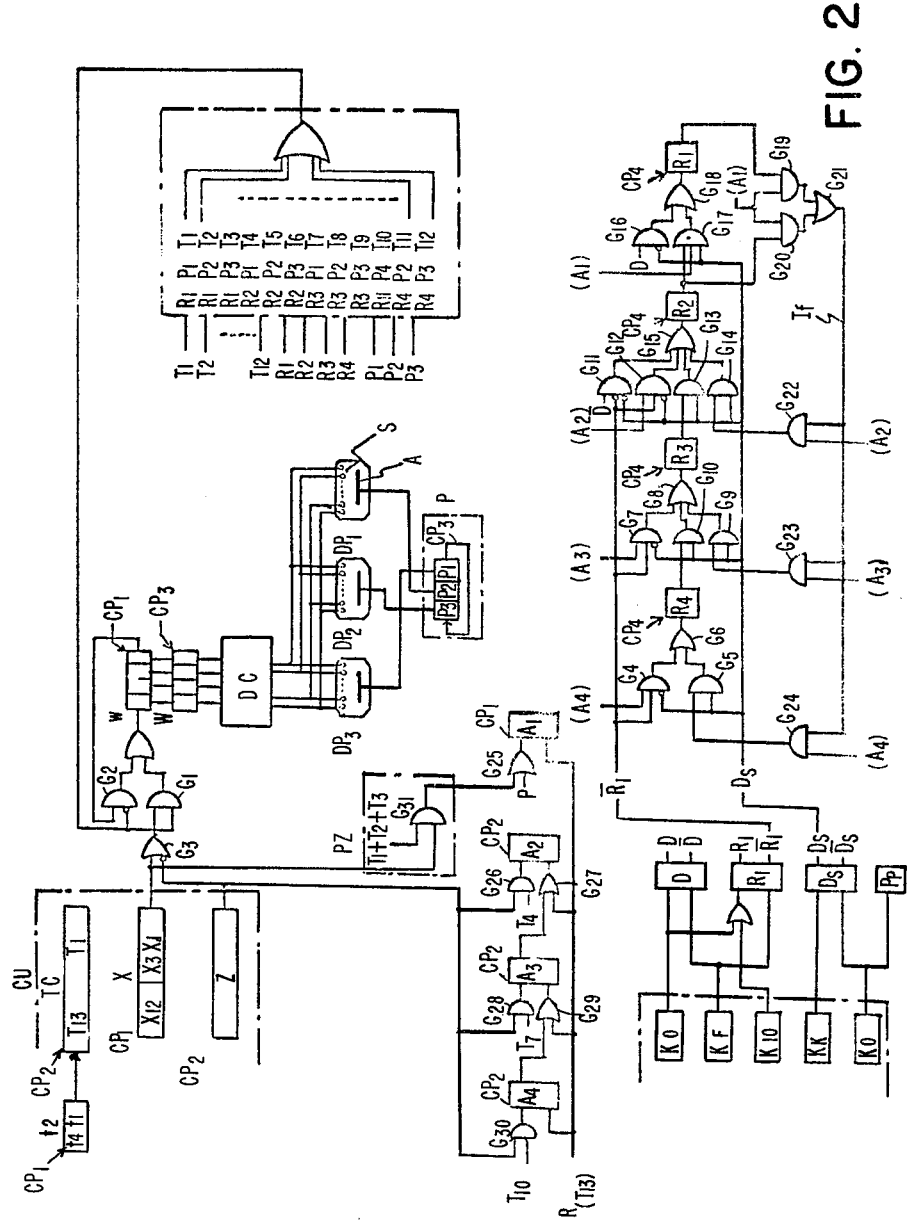
FIG. 2 is a schematic showing of an embodiment of control circuits in accordance with the teachings of the present invention.

FIG. 2 shows control circuits for controlling the digit display system as described above, and FIG. 3 is a time chart for explaining the operation of the FIG. 2 control circuits.

CU is an operation control and X is a dynamic sfift register of 12-digits for storing the numeral information introduced or operated out, the numeral information of every digit is put out periodically from the last digit $X_1$ thereof. TC is a digit time counter of 13-digits. The numeral information in the register X is shifted in synchronization with the change of the counter condition of the timing counter tc. tc is a 4-bit time counter, and divides the digit time. Fundamental clock pulses $CP_1$, the period of which determines the bit time, are used as clock pulses for the bit time counter. The clock pulses for the digit time counter are $CP_2$ which occur once every 4-bits.

The register X is the shift register which shifts the contents every one bit, clock pulses for the register are $CP_1$. Z is a register for starting zero-suppress information related to the digit information in the register X. The digit having the invalid 0 in the integral part except in the $10^0$-digit is distinguished from the other digits, that is, for example, the valid digit is stored as 1 and the invalid digit is stored as 0. Generally, these signals are called as zero-suppress signals. Control for the zero-suppress signals is proposed in various fashion but it is unnecessary to describe in detail the manner of control.

$DP_1$-$DP_3$ are display umits of 3-digits for selectively displaying the contents of the register X, each display unit comprises a common electrode A and plurality of segment electrodes S for establishing numeral patterns.

The present display units are controlled in a dynamic fashion. Time division signals $P_1$-$P_3$ are applied to the common electrode, and the common electrode is selected in a time division fashion.

The time division signals are derived from a counter P which counts the clock pulse $CP_3$ or one word period signals.

On the contrary segment selection signals are applied to the segment electrodes, the segment selection signals being applied in synchronization with the timedivision signals, and being derived from the contents stored in the register X. A block matrix circuit MA decides the block for display, and the numeral information in the decided block of the register X is progressively introduced into the first buffer register w by every digit. The numeral information is converted into signals, synchronous with the signals for the common electrodes and having the same period of time as signals for the common electrodes, at the second buffer W and the signals are converted into the segment signals at a decoder DC. The converted segment signals are applied to the segment electrodes, and the dynamic display is achieved by cooperation of the segment signals and the signals for the common electrode.

The matrix circuit MA decides the condition in accordance with the combination of digit time signals $T_1$ - $T_{12}$ which express the digit time where the information of the digit in the register X is put out at the lower most digit $X_1$, the time division signals $P_1$ - $P_3$ which are applied to the common electrode, and block signals $R_1$ - $R_4$ which express blocks divided with reference to the decimal point.

In the case where the first block comprises the $X_1$ - $X_3$ which store the numeral information in the decimal part, the second block comprises the $X_4$ - $X_6$, the third block comprises the $X_7$ - $X_9$ and the fourth block comprises the $X_{10}$ - $X_{12}$, respectively. $R_1$ is selected when the first block is desired to be displayed, $R_2$ is for the second block, $R_3$ is for the third block and $R_4$ is for the fourth block, respectively.

Now assume that the first block is desired to be displayed, the content of $X_1$ appears at the outputs of $X_1$ at the digit time $T_1$, the content of $X_2$ appears at the outputs of $X_1$ at the digit time $T_2$ and the content of $X_3$ appears at the outputs of $X_1$ at the digit time $T_3$, respectively.

If the first block is desired to be displayed, the numeral information must be taken out from the register X at the time of $T_1$ - $T_3$. It may be understood that the numeral information for displaying the second block is taken out at the time of $T_4$ - $T_6$, the third block at the time of $T_7$ - $T_9$ and the fourth block at the time of $T_{10}$ - $T_{12}$, respectively.

The following is the additional description of the time division signals $P_1$ - $P_3$ having one word period and being applied to the common electrode A of the display units.

To take out the numeral information of the every block from the outputs of the register X, the digit time signals for taking out the information are selected. The following is a chart showing the time for taking out the information from the register X and applying it to the segment electrodes of the display units in displaying every block.

| display unit | 1BL | 2BL | 3BL | 4BL |
| --- | --- | --- | --- | --- |
| $DP_1$ | $T_1$ | $T_4$ | $T_7$ | $T_{10}$ |
| $DP_2$ | $T_2$ | $T_5$ | $T_8$ | $T_{11}$ |
| $DP_3$ | $T_3$ | $T_6$ | $T_9$ | $T_{12}$ | where BL is an abbreviation of the block.

It is clear from the chart that, for example, $DP_1$ displays the information stably in the case where the common electrode of $DP_1$ is selected only at the time of $T_1$, $T_4$, $T_7$, and $T_{10}$.

In fact it must be taken into consideration that the information is put out from the register X bit-by-bit and the whole information of one digit is needed to display the information. That is, there is some time delay since the display must be carried out after the whole information of one digit is taken out. Because of the facts described above, the common electrode cannot be selected purely at the time of $T_1$, $T_4$, $T_7$ and $T_{10}$. In any way, in accordance with the teachings of the display system of the above-described type, the information is displayed only during one digit time in one word cycle, and the duty cycle of display becomes about 1/ the digit-capacity of the register.

The stable display may be obtainable by the systems described above, but the duty cycle of display is 1/ the digit-capacity of the display units in the embodiment, since the present invention is to reduce the number of display units with reference to the digit-capacity of the register.

Only three-digits of numeral information are taken out from the register X in every block. Therefore, in the present embodiment, a three word time cycle is chosen as a period and the numeral information in the first digit of each block is taken out and held during the period of one word. On the contrary, the common electrode is selected by the time division signals having the one word width and being repeated in a three word time cycle. And thus, $DP_1$ displays the numeral information.

In the period of the second word time, the numeral information in the second digit of each block is taken out and the information is held during the period of one word for displaying the numeral information on $DP_2$.

In the period of the third word time, the numeral information in the third digit of each block is taken out and the information is held during the period of one word for displaying the information on $DP_3$.

It may be understood from the foregoing description that the duty cycle of display is 1/3.

The signals having the period of three words are $P_1$ - $P_3$.

The time for taking out the information from the register X in the condition of the first block display is during the period of time when the block selection signals $R_1$, which concerns the display of the first block, is chosen, and at the time digit $T_1$ in the first word period $P_1$, at the digit time $T_2$ in the second word period $P_2$ and at the digit time $T_3$ in the third word period $P_3$, respectively. This is expressed in a logical formula $R_1(P_1.T_1+P_2.T_2+P_3.T_3)$.

The numeral information in a certain digit of the register X is selected by the outputs of the matrix circuit MA and the one-digit information is introduced into the first buffer w. For example, in the case where the first block is selected to be displayed, the content of $X_1$ is introduced into the buffer w at the digit time $T_1$ in the first word period $P_1$.

The introduced information, the content of $X_1$, is held at the buffer w by circulating it through a gate $G_2$, since the information of the second word is introduced at the time $P_2.I_2$. The content of $X_1$ is shifted to the one digit buffer W by application of clock pulses $CP_3$ which is generated at the terminating time $T_{13}$ of one word, the one digit buffer W storing the information during the period of one word time.

The one digit buffer W is controlled by the clock pulse $CP_3$, and every element for storing the information holds the state thereof before the next clock pulses $CP_3$ are applied to it, the clock pulses $CP_3$ being generated at the terminating time of one word.

These states may be clear from the FIG. 3 time chart. The numeral information in the register X is introduced into the buffer W at a different time for a different digit of the register X. However, the content of the buffer W at the digit time $T_{13}$ is always the one wanted, wherein the digit time $T_{13}$ is the adjacent digit time to the digit time $T_{12}$ being the time of output of the uppermost digit of the register X.

The following is an explanation of the way of displaying the first digit of the first block, or the content of $X_1$, on the display unit $DP_1$. The content of $X_1$ is taken out from the register X at the same time $R_1.P_1.T_1$. However the content of $X_1$ is held at the second buffer W at the time of the second word time $P_2$ lagging one word period, the second buffer W storing the information for the segment signals. Because of this, the time division signals applied to the common electrode of the display unit $DP_1$ are the time division signals $P_2$.

Similarly, the time division signals $P_3$ are applied to the common electrode of the display unit $DP_2$ and the time division signals $P_1$ are applied to the common electrode of the display $DP_3$.

The following is the description of means for suppressing the invalid zero.

Zero-suppress signals Z are applied to the buffer w via an OR gate $G_3$. In this embodiment, the zero-suppress signals Z are signals which express the valid part as 1 and the valid part as 0. The gate receives signals $\overline{Z}$ at the input terminal thereof, that is, it receives "1" when the digit is invalid.

The information stored at the register X is the binary-coded decimal type, that is, 0000 for the numerical value 0, 0001 for 1, 0010 for 2, .... 1001 for 9, respectively. The signals $\overline{Z}$ change the content of the buffer w to 1111, and the decoder DC is made not to select all of the segments when 1111 is applied, that is, 1111 is a redundancy code. And then the invalid zero is not displayed.

The matrix circuit MA receives the block signals $R_1$-$R_4$ as input conditions. The block signals $R_1$-$R_4$ determine the block for display in accordance with various conditions as explained by FIG. 1.

The following is the description of control for setting the conditions.

The block signals $R_1$-$R_4$ are derived from D-type flips-flops $R_1$-$R_4$. The D-type flip-flops $R_1$-$R_4$ comprise a ring counter with the use of the particular ones thereof upon receipt of the shift signals derived by depression of the shift key $K_K$, and the block signals, for dividing the numeral information with reference to the decimal point thereof, are generated progressively.

$A_1$-$A_4$ are RS flip-flop for deciding the block preferentially displayed at the time of introduction of numeral information and completion of operation.

The conditions for display are as follows:
1. The second block is displayed when the numeral information of the integer part is introduced.
2. The first block is displayed after the decimal point key is depressed.
3. The uppermost block having the valid numeral information is displayed when the operation is completed.
4. The adjacent lower block is displayed when the selection switch is depressed. Every block is displayed progressively upon depression of the selection switch. The display returns to the uppermost block having the valid numeral information from the first block in the case the decimal part has the valid numeral information, and from the second block in the case that the decimal part does not have the valid numeral information.

The following is an explanation of the control for satisfying the above-mentioned conditions.

$R_1$-$R_4$ are the flip-flops for indicating the block to be displayed. And the flip-flops $R_1$-$R_4$ operate to satisfy the conditions 1-3 unless the selection switch is depressed.

First of all, the condition 1 will be explained.

Only the flip-flop $R_2$ is in the set state, in conclusion. The state of introduction of the numeral information of the integral part is judged as follows:

A RS flip-flop $R_I$ for deciding the state of read-in, a RS flip-flop D for deciding the decimal point and a RS flip-flop $D_S$ for deciding the depression of the selection switch are provided. The RS flip-flop $R_I$ is turned to the set state by depression of numeral keys $K_{10}$, that is 0-9, or depression of a decimal point key K. and is turned to the reset state by depression of operation instruction keys $K_F$. The RS flip-flop D is turned to the set state by the decimal point key K. and the reset state by the operation instruction keys $K_F$. The RS flip-flop $D_S$ is turned to the set station upon depression of the shift key $K_K$ and turned to the reset state upon application of signals Ko which is generated by depression of the numeral keys $K_{10}$, the decimal point key K. or the operation instruction key $K_F$. And then the introduction of information of the integer part is concluded in the condition of $R_I.\overline{D}.\overline{D_S}$.

A gate $G_{11}$ judges the condition and only the flip-flop $R_2$ is turned to the set state and then the second block is displayed, if the condition is affirmative.

The following concerns the condition 2.

The condition is $\overline{D_S}.R_I.D$ when the decimal point key K. is depressed. The RS flip-flop $R_I$ is always in the set state when the RS flip-flop D is in the set state. And the condition may be expressed as $\overline{D_S}.D$. A gate $G_{16}$ satisfies the condition $\overline{D_S}.D$ and only the flip-flop $R_1$ is turned to the set state, thereby displaying the first block.

The following concerns the condition 3.

The condition 3 is changed in accordance with the result of operation. The uppermost block having the valid numeral information must be identified. In the case where all of the numeral information in the integral part is zero the second block must be selected, since the second block has the digit of $10°$ and the decimal point is on the digit of $10°$. In other cases, one of the blocks from the second to the fourth must be selected.

Flip-flops $A_2$-$A_4$ decide the uppermost block having the valid numeral information therein. The second block is selected when the flip-flop $A_2$ is in the set state, the third block is selected when the flip-flop $A_3$ is set and the fourth block is selected when the flip-flop $A_4$ is in the set state, respectively. Gates $G_{12}$, $G_7$ and $G_4$ decide the state of the flip-flops $R_2$, $R_3$ and $R_4$ in accordance with the state of the flip-flops $A_2$, $A_3$, $A_4$, and the gates $G_{12}$, $G_7$, $G_4$ also receive the condition $\overline{R_I.D_S}$, or the condition of operation. When the flip-flop $A_2$ is set, the flip-flop $R_2$ is set and the second block is displayed. When the flip-flop $A_3$ is set, the flip-flop $R_3$ is set and the third block is displayed.

The following concerns the condition 4.

The condition 4 concerns an operation caused by the depression of the shift key $K_K$. The flip-flops $R_1$-$R_4$ comprise an ring counter via a feed-back line $1_f$, as described earlier, and control the display progressively from the upper block to the lower block. The condition 4 is the state that the selection switch $K_K$ is depressed in the state of the first, second or third condition. When the selection switch is depressed under the condition of the flip-flop $R_4$ is in the set state, the flip-flop $D_S$ is turned to the set state and the flip-flop $R_3$ is turned to the set state via a gate $G_8$, and the display advances from the fourth block to the third block. The flip-flops $R_2$ and $R_1$ are in the reset state and hence gates $G_{22}$, $G_{23}$, $G_{24}$ do not open. In the case where the flip-flop $R_3$ is in the set state and the selection switch id depressed, the flip-flop $D_S$ is turned to the set state and the flip-flop $R_2$ is turned to the set state via a gate $G_{13}$, then the second block is displayed. The gates $G_{22}$, $G_{23}$, $G_{24}$ do not open.

In the case where the shift key $K_K$ is depressed under the condition that flip-flop $R_2$ is in the set state, hence the second block is displayed, the condition of display is decided in accordance with the state of the flip-flop $A_1$, the flip-flop $A_1$ determining whether the invalid numeral is in the decimal part. The flip-flop $A_1$ is turned to the set state when the flip-flop D is in the set state which turns to the set state by depression of the decimal point key or the decimal part has the valid numeral information. The flip-flop $R_1$ is turned to the set state via a gate $G_{17}$ when the flip-flop $A_1$ is turned to the set state, and then the first block is displayed. On the contrary, in the case where the flip-flop $A_1$ is in the reset state, a gate $G_{20}$ is opened and the set signals are fed back to the preceding site via one of the gates $G_{22}$, $G_{23}$, $G_{24}$. The condition of the flip-flops $A_2$-$A_4$ are settled in accordance with the content of the register X, and the flip-flops $A_2$-$A_4$ memory the uppermost block which has the valid numeral information. The set state of the flip-flop $R_2$ is shifted to one of the flip-flops $R_2$, $R_3$, $R_4$ which control the display in such a way that the uppermost block containing the valid numeral information is displayed.

In the case where the selection switch is depressed under the condition that the flip-flop $R_1$ is in the set state, the set signals are fed back to one of the flip-flops $R_2$, $R_3$, $R_4$ via gates $G_{19}$ and $G_{21}$, since the flip-flop $A_1$ is in the set state.

The display block is selected progressively in accordance with the depression of the shift key $K_K$ as described above.

The flip-flops $R_1$-$R_4$ receive a clock pulse $CP_4$ being expressed as follows:

$$CP_4 = (PP + \overline{D}_s) CP_3$$

where PP is a pulse being of one word width and occurring every depression of the shift key.

In the case where the selection switch $K_K$ is not depressed, or in the $D_s$ state, the state of the flip-flops $A_1$-$A_4$ are circulated and memoried by clock pulses which are generated every one word. After the depression of the shift key $K_K$, the state of the flip-flops $R_1$-$R_4$ are shifted by the clock pulse $CP_4$ which is generated every depression of the shift key $K_K$.

The following is desception of the flip-flops $A_1$-$A_4$. The flip-flops $A_2$-$A_4$ detect the uppermost block having the digit of valid numeral information, and the flip-flop $A_1$ detects whether the decimal part has the valid numeral information.

In this embodiment, the register X has twelve digits and the information is taken out from the digit $X_1$. The information of the first block is taten out at the digit time $T_1$-$T_3$, the second block is at the digit time $T_4$-$T_6$, the third block is at the digit time $T_7$-$T_9$ and the fourth block is at the digit time $T_{10}$-$T_{12}$, respectively.

Outputs of the zero-suppress register Z are synchronized with the outputs of the register X. The outputs of the zero-suppress circuit Z is 1 at the digit time $T_1$ where the content of $X_1$ is valid, 1 at the digit time $T_2$ where the content of $X_2$ is valid, --------, 1 at the digit time $T_{12}$ where the content of $X_{12}$ is valid.

The determining any blocks wherein the uppermost digit in the effective numeral information exists, consists the first detection as to whether the valid numeral exists in each block, and the ignoring of the detection for lower blocks when the counterpart for upper blocks develops. More specifically, determinations as to the existance of the valid numeral information in each block are formed on $X_4$, $X_7$, $X_{10}$ for the second, third, fourth blocks, respectively. The zero suppress states for these digits are established by $Z.T_4$, $Z.T_7$, $Z.T_{10}$ through the gates $G_{26}$, $G_{28}$, $G30$. Therefore, determinations of the uppermost block containing the valid numeral information may be accomplished by resetting the flip-flops $A_2$ and $A_3$ in response to set signals from the flip-flops $A_3$ and $A_4$, respectively. Since the register X includes different contents in accordance with the operation results and introduced information, $R_1$-$R_4$ should be reset at every last digit time $T_{13}$.

Meantime, the existance of the valid information in the decimal part is sensed by a judge circuit DZ in the case where 1 stands in any one of four bits under the assumption, for example, numeral information 0 is represented by a succession of 0 (i.e., 0000) this is accomplished by the application of logical outputs $X_1(T_1+T_2+T_3)$ to the set input terminal of the flip-flop $A_1$ which has detection functions every one bit.

Although the set time period of the flip-flops $A_1$-$A_4$ is delayed, the flip-flop $A_4$ is set at the time $T_{11}$ within a sequence of the digit time.

Figure 4:
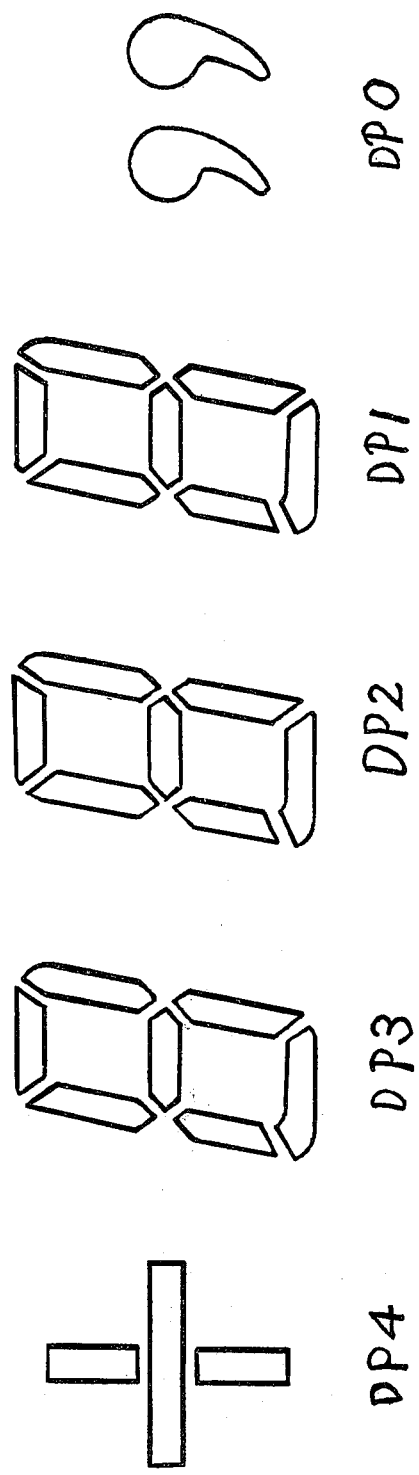
FIG. 4 is a display pattern in accordance with the system of FIG. 2.

FIG. 4 illustrates the pattern of display segment configuration in the case of 888,000,000.

In this drawing the reference $DP_3$, $DP_2$, $DP_1$ correspond to the display units $DP_3$, $DP_2$, $DP_1$ as shown in FIG. 2. The additional units $DP_0$ and $DP_4$ display the punctuation and sign contained in the displayed numeral information.

There have been demonstrated and disclosed the block division display system on the same plane wherein such division is effected by manually operated shift key $K_K$. Alternately, such division display may be realized in automatic mode by any suitable generator which generates the clock pulse $CP_4$ at a fixed rate, by conventional techniques well known in the art. Moreover it is to be understood that the present system is applicable to more than three-digit division display.

We claim:

1. A digital display system controlled in a dynamic fashion in an electronic calculator comprising:
    display means having N digits capacity, said display means including N display units, each of said units comprising a common electrode and a plurality of segment electrodes;
    a first register means for storing the numeral information to be displayed, the digit capacity of the first register means being M times the N digits of the display units, wherein M is an integer greater than or equal to 3; a first buffer register means for storing digit information transmitted digit by digit from the first register means, the content of the first buffer register being supplied through a decoder to the segment electrodes of the display units;
    a counter means for generating time division signals appearing during one word period once every N words, each of the signals being supplied to the common electrode of the display units;
    conditional flip-flops for selecting a display block in the first register means consisting of M blocks each of which includes N digits and generating a block signal;
    shifting means for sequentially shifting a condition of the conditional flip-flops to change the display block;
    a matrix circuit receiving the time division signal, the block signal and digit time signals and generating a gate control signal; and
    gate means connected between the first register means and the first buffer means for controlling the output signals of the first register means by the gate control signal whereby one word of the digit numeral information contained in the display block of the first register means is transmitted selectively to the first buffer register means.

2. A digital display system of claim 1 further comprising first means for detecting a uppermost block containing valid digit information in the first register means, and
    second means for setting the conditional flip-flops to the condition of displaying the uppermost block in accordance with the output of the first means, whereby the display units visually display firstly the uppermost block and then sequentially display the following lower block of the valid information in the first register means.

3. A digital display system of claim 2, wherein the first means comprises second register means for storing coded information indicating the valid digit and an invalid digit of the numeral information in the first register means,
    and memory flip-flops for memorizing the uppermost block in said first register means in accordance with coincidence of the digit time signals and the output signal of the second register means.

4. A digital display system of claim 1, wherein said first register means includes at least one block for storing only the decimal part of the numeral information, and the conditional flip-flops include a flip-flop turned to the set state upon depression of a decimal point key for displaying the decimal part.

5. A digital display system of claim 1, wherein the conditional flip-flops are connected with each other via control gates to form a ring counter.

6. A digital display system of claim 1, wherein the shifting means comprises a shift key producing a shift signal by depression for manually changing the display block.

7. A digital display system of claim 1, wherein the shifting means comprises a clock pulse generator for automatically changing the display block.

8. A digital display system of claim 1, wherein the digit number N of the display units is 3.

9. A digital display system of claim 8, further comprising an additional display unit for displaying the punctuation in the displayed numeral information.

10. A digital display system of claim 1, further comprising a second buffer register means connected between the first buffer register means and the decoder for holding the display information during the period of one word, whereby the duty ratio of display increases to 1/N from 1/N'M.

* * * * *